United States Patent [19]
Ford et al.

[11] Patent Number: 6,023,361
[45] Date of Patent: Feb. 8, 2000

[54] FIBER OPTIC NETWORK USING SPACE AND WAVELENGTH MULTIPLEXED DATA CHANNEL ARRAYS

[75] Inventors: Joseph E. Ford, Oakhurst; Wayne H. Knox, Rumson; Ashok V. Krishnamoorthy, Middletown; David A. B. Miller; Martin C. Nuss, both of Fair Haven, all of N.J.

[73] Assignee: Lucent Technologies Inc., Murray Hill, N.J.

[21] Appl. No.: 09/231,054

[22] Filed: Jan. 14, 1999

Related U.S. Application Data

[62] Division of application No. 08/691,101, Aug. 1, 1996, Pat. No. 5,912,751.
[60] Provisional application No. 60/018,417, May 28, 1996.

[51] Int. Cl.[7] .................................................. G02F 1/13
[52] U.S. Cl. .......................................... 359/152; 359/124
[58] Field of Search ................................ 359/152, 124, 359/130, 173; 385/14

[56] References Cited

U.S. PATENT DOCUMENTS

| | | | |
|---|---|---|---|
| 5,479,539 | 12/1995 | Goldsmith et al. | 359/152 |
| 5,914,976 | 6/1999 | Jayaraman et al. | 359/152 |

*Primary Examiner*—Kinfe-Michael Negash

[57] ABSTRACT

A network for multi-bit word parallel communication between optoelectronic chips on a two dimensional array of optical input and output channels carried on a single dimension of optical fibers. Each bit of a word is carried on a different wavelength and the multiple wavelengths carrying a word are wavelength multiplexed onto a single optical fiber. Multiple fibers can be joined into a one dimensional array of fibers. A transceiver for transmitting and receiving along the optical data channels comprises an array of modulators powered by individual wavelength light beams, either from individual monochromatic light sources and a light beam from a single broadband light source made to pass through a diffraction grating. The modulators are positioned so that each modulator reflects a different wavelength light beam, thereby providing multiple optical channels. Alternatively, multiple wavelengths are generated from CMOS integrated light sources. These multiple optical channels are then collimated and guided into one single mode fiber or multiple multimode fibers at its transmitting end. At the receiving end a diffraction grating is used to separate the distinct data channels by their individual wavelengths. The multiple wavelengths are then caused to fall on an array of optical detectors spaced according to the individual wavelengths to be detected. By constructing a one dimensional array of these fibers, a two dimensional array of optical data channels is realized. The size of the array is determined by the number of fibers and the number of distinct wavelengths combined in each fiber.

10 Claims, 7 Drawing Sheets

FIBER OPTIC NETWORK USING SPACE AND WAVELENGTH MULTIPLEXED DATA CHANNEL ARRAYS

REFERENCE TO RELATED APPLICATIONS

This application is a divisional of U.S. patent application Ser. No. 08/691,101 filed Aug. 1, 1996 now U.S. Pat. No. 5,912,751; which claims the benefit of U.S. Provisional Application No. 60/018,417 filed May 28, 1996.

FIELD OF THE INVENTION

The present invention relates generally to fiber optic communications using the technique of wavelength division multiplexing. In particular, the invention relates to using space and wavelength division multiplexing to create a two dimensional optical data channel array from a one dimensional optical fiber array.

BACKGROUND OF THE INVENTION

Surface normal optical interconnections can provide high density, high bandwidth communication between electronic components. One technology used to achieve this involves attaching a two-dimensional array of GaAs Multiple Quantum Well ("MQW") diodes as light detectors and modulators onto a prefabricated silicon VLSI chip using a flip-chip bonding technique, more fully described in Goossen, K. W. et al., "GaAs MQW Modulators Integrated with Silicon CMOS," IEEE Photonics Technology Letters p. 360–62 (April 1995), hereby incorporated by reference as if fully set forth herein. This technology can be used to fabricate complex, high density silicon optoelectronic VLSI circuits, as described in Goossen, K. W., et al., "Method of Designing an Electronic Integrated Circuit with Optical Inputs and Outputs," U.S. patent application Ser. No. 08/403,326, filed on May 14, 1995.

One of the key features of this technology is that the optical input/output interfaces are arranged over the two dimensional surface of the chip, rather than along its perimeter, thereby allowing for a greater number of channels to interface with the chip than otherwise possible. However, to take advantage of this technology, the optical system that delivers the data to the chip must access the chip along both dimensions of the chip surface.

Conventional optics can image onto a chip surface a two dimensional array of optical data channels between two optoelectronic chips. Computing and communication systems with multiple optoelectronic chips can be connected by precision optics provided the distances are small enough that optical alignment between the chips can be maintained. However, if the optical data signals are to be carried for more than a few meters the signals must be transported by optical fiber. Effective interconnection of such distant optoelectronic chips then requires efficiently coupling a two dimensional array of data signals into and out of optical fiber.

One method for providing two dimensional access to a chip is to use a two dimensional array of single mode optical fibers. This method has been used to deliver signals to a photonic ATM switch chip, as described in Lentine, A. L. et al., "Demonstration of an Experimental Single-Chip Optoelectronic Switching System," Proceedings 1995 LEOS Annual Meeting (November 1995). However, whereas fabricating a one dimensional array of single mode optical fibers is fairly routine, as a result of the stringent alignment requirements between fibers, manufacturing a two dimensional fiber array with a desired accuracy is difficult and costly.

SUMMARY OF THE INVENTION

Accordingly, it is an object of the present invention to provide fiber optic communications between multiple optoelectronic chips with two dimensional optical data input and output channels.

It is also an object of the present invention to provide a two dimensional array of optical channels from a one dimensional array of fibers.

Another object of the present invention is to interconnect a network of optical network interfaces with optical fibers, and optoelectronic circuits with surface normal optical input and output.

Yet another object of the present invention is to carry data signals between optoelectronic circuits in a multi-bit word parallel fashion by using multiple optical wavelengths where each wavelength represents one bit of an electronic word.

Yet still another object of the present invention is to use a single optical source to provide optical power for an entire network of optoelectronic terminals which transmit data by optical intensity modulators.

In furtherance of these objectives an optical network comprising optical network interfaces and an interconnection switch uses space and wavelength division—multiplexed data channel arrays to communicate information. Each optical network interface has an optoelectronic chip capable of transmitting and detecting optical data signals at a plurality of wavelengths through devices on the surface of the chip. Data is transmitted by varying the output intensity of light either from an external optical power source passing though a local optical modulator, or from a plurality of CMOS integrated light sources, such as Vertical Cavity Surface Emitting Lasers ("VCSELs"), arranged along the two dimensional surface of the chip. The external optical power can originate from either a broad wavelength spectrum source or a plurality of monochromatic sources, and carried to the optical network interface through an optical fiber. The fiber is imaged onto the chip through a diffraction grating, thereby separating the light into its constituent wavelengths and causing each individual wavelength to fall on a different position on the chip. A column of optical modulators are positioned so that each is illuminated by a distinct wavelength. The modulators vary the reflectivity of the incident light such that the reflected light carries a time series of signal transmitting information bits. Where CMOS integrated light sources power each optical network interface, information is transmitted by varying the output intensity of the integrated light sources, where each source in one column emits a different wavelength. The use of integrated light sources eliminates the need for modulators and external light sources.

The optical signal from one multiple wavelength column is collected by imaging the chip through a diffraction grating onto a single optical fiber. The optical fiber carries the optical signals, each on a distinct wavelength, to their destination. At the receiving node, the optical fiber is again imaged through a diffraction on to the surface of an optoelectronic chip, where each individual wavelength signal falls on a different position on the chip. A column of optical detectors are positioned so that each is illuminated by a distinct wavelength signal corresponding to one of the optical modulators on the transmitting chip.

By arranging the input and output fibers in the optical network in a one dimensional line not parallel with the direction of the spread of diffracted wavelengths, a two dimensional array of optical data channels is realized. For an optical network interface, this array may consist of one output column and one input column, where the length of the column is equal to the number of independent data channels connected the interface. For an interconnection switch, the size of the array may be equal to one input and one output column for each of the optical network interfaces to be interconnected, where the length of the column is again equal to the number of independent data channels connecting each optical network interface.

DETAILED DESCRIPTION OF THE INVENTION

The present invention provides a two dimensional optical channel array from a one dimensional optical fiber array, using a technique known as Wavelength Division Multiplexing ("WDM"), well known in the art for providing high total bit rates using low individual bit rate channels. U.S. patent application Ser. No. 08/151,441, filed on Nov. 12, 1993 for "High Density Optical WDM" commonly assigned with the present application. It is well known in the prior art that in a free-space optics wavelength demultiplexing system, an input point, e.g. the end of a fiber, can be imaged onto an image plane through a grating. Where the light is monochromatic, a single spot will appear on the image plane, its location determined by its wavelength. Where the light is broadband, as is the case with WDM, the input light from a single point will be dispersed along the image plane according to its constituent wavelengths.

The present invention uses WDM to guide multiple single wavelength light beams through a single optical fiber, where each single wavelength light beam carries a different data channel. At each end of the optical fiber, the multiple wavelengths are separated by passing the light through a diffraction grating. Since the present invention uses multiple point sources, one for each processor, the effect of the dispersed light on the image plane is a two dimensional field on imaged spots. For example, where a 100 Mbit/s rate is desired, 10 bits can be sent simultaneously through an optical fiber at a rate of 10 Mbit/s each. Since multiple bits are sent at once, each bit data channel can operate at a slower rate and consequently at a lower cost.

Figure 1:
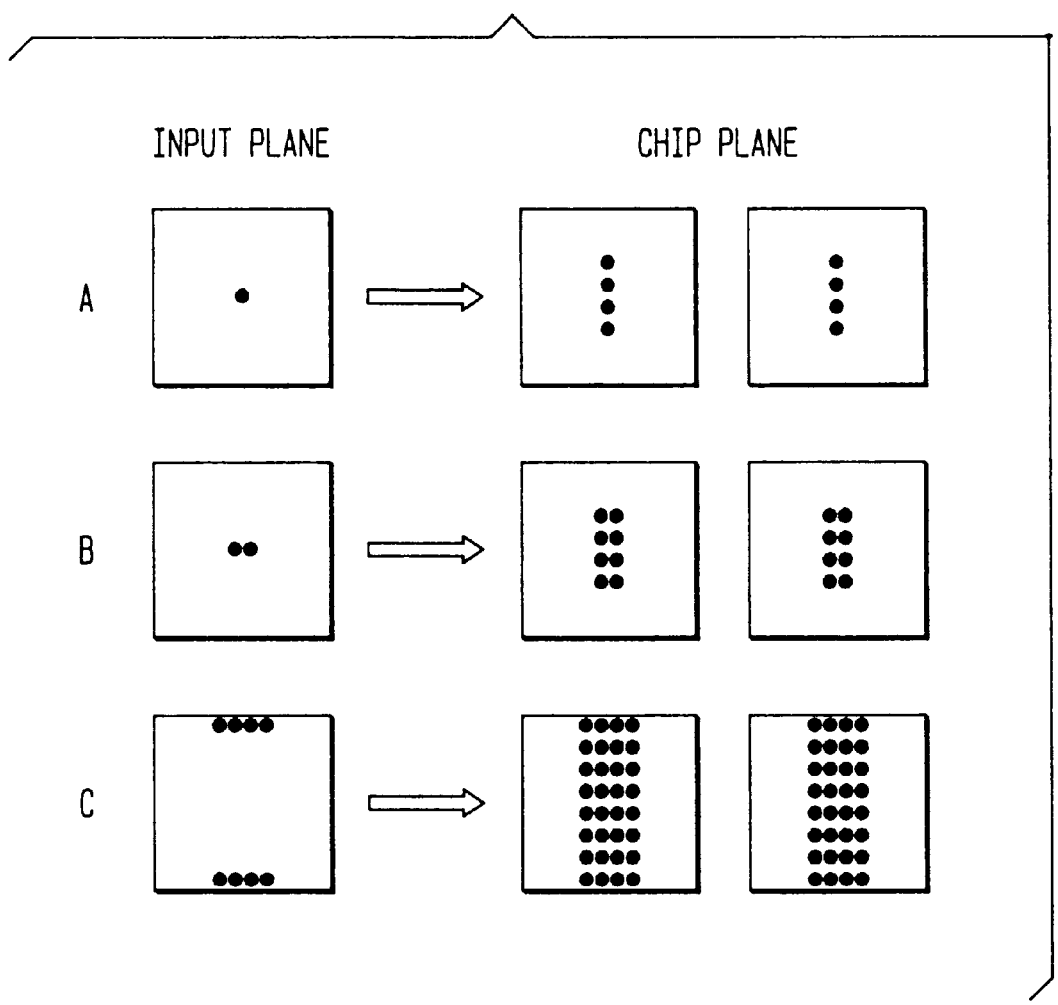
FIGS. 1A–C illustrate wavelength division multiplexed channels incident on a chip plane.

Referring to FIG. 1, WDM generally provides access to a one dimensional array of devices through its multiple channels, as shown in FIG. 1A. However, a two dimensional optical array can also be realized by using a one dimensional array of multiple WDM optical 1) fibers. Each optical fiber can be single mode or multimode. Due to the lower cost of multimode components, multimode may be preferred where transmission distances are less than the modal dispersion limit of the fiber. Single mode however, has longer range for high data rates. Furthermore, since single mode has smaller guided mode diameter, the illuminating spot is smaller at the modulator and detector surfaces than with multimode fibers, thereby reducing interference between channels, as described below. The array of fibers provides one dimension and the multiple wavelengths in each fiber provide the second dimension. In an application requiring two arrays of two dimensions each, such as a set of N input WDM fibers and a set of N output WDM fibers, the fibers can either be arranged as a single 2N array, as in FIG. 1B where N is 1, or as two one dimensional arrays, as in FIG. 1C where N is 4, provided the separation between the fibers considers the optical wavelength bandwidth.

Figure 2:
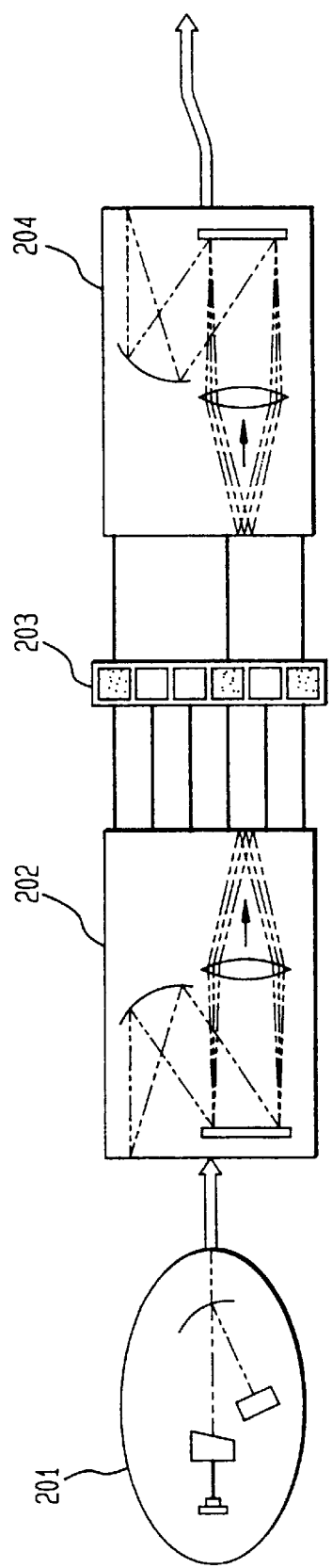
FIG. 2 illustrates a wavelength division multiplexed transmitter using a single short pulse laser source and free space optics.
Figure 3:
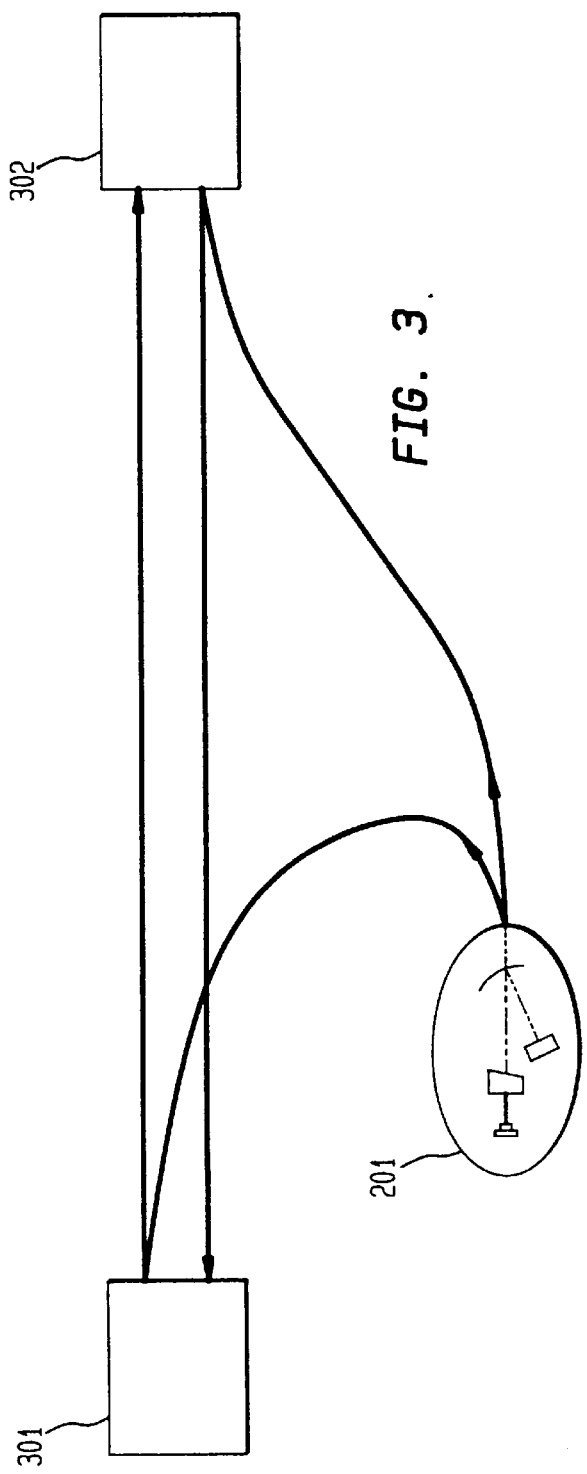
FIG. 3 shows two WDM transmitters powered by a single short pulse laser source.

The multiple single wavelengths for each channel can be provided through individual broadband light sources for each set of channels, combined with wavelength division multiplexing for each channel, or multiple single wavelength sources for each channel. Alternatively, a single broadband light source can be used to provide the desired multiple single wavelengths for each channel. Examples of broadband light sources include short pulse lasers, amplified simulated emission sources, incoherent arc lamps and amplified light emitting diodes. Referring to FIG. 2 a WDM data transmitter is shown using a short pulse laser 201, on the order of one hundred femtoseconds, as a broadband source. Free space optics 202 includes a diffraction grating, through which the broadband light passes and the constituent wavelengths are distributed. The dispersed wavelengths are then applied to a surface-normal modulator 203 to apply the data signals. The reflected light is then guided into an optical fiber for transmission as shown in 204. A 16 channel transmitter based on this principle is described in De Souza, E. et al., "Wavelength-Division Multiplexing with Femtosecond Pulses," Optics Letters pp. 1166–68, Vol. 20, No. 10 (1995), hereby incorporated by reference as if fully set forth herein. The single broadband light source can power more than one WDM transmitter, such as transmitters 301 and 302, using a beamsplitter as shown in FIG. 3.

The broadband source can be either a short pulse laser, such as a femtosecond laser, or an incoherent source, such as an arc lamp, or an amplified spontaneous emission source. While the source spectrum is continuous, the modulators and hence the data channels are discrete. As a result, some light from the source will fall between the modulators. At best this loss of light is wasted power. At worst, however, the lost light can produce noise that will interfere with the data channels.

Figure 4:
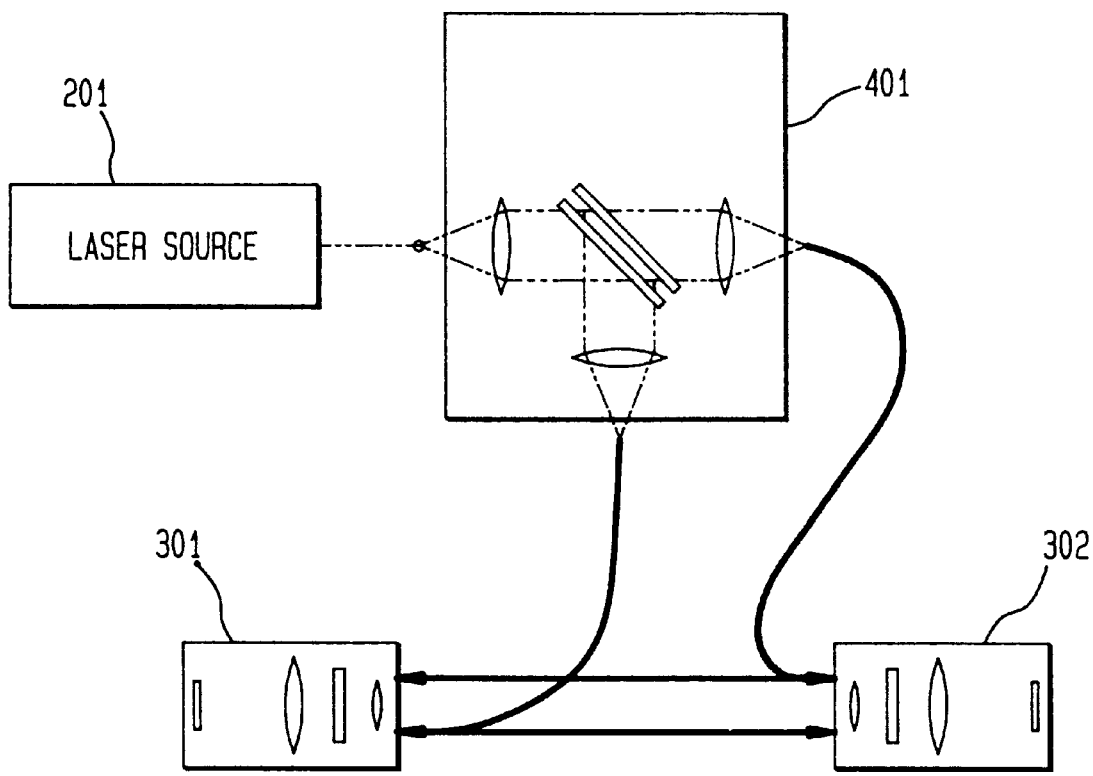
FIG. 4 shows the use of an etalon filter to maximize the signal to noise ratio of the signal transmitted by each of the transmitters of FIG. 3.

Referring to FIG. 4, one advantageous embodiment of the present invention is shown employing an etalon filter 401, whose transmission as a function of wavelength is a series of peaks at the data transmission wavelengths to convert the continuous spectrum into a series of maxima and minima that are spaced a distance that corresponds to the arrangement of modulators so as to minimize the amount of light falling therebetween. The diameter of the broadband light beam is first expanded to reduce edge effects that blur the filter's response. The expanded beam is then collimated and made to pass through a filter at an angle to the plane of the light beams (shown as 45° in FIG. 4), chosen to avoid back reflections into the input fiber or to couple the reflected light into a second output filter. The etalon filter 401 acts as a beamsplitter that separates the continuous source spectrum into two beams with alternating wavelengths. The transmitted and reflected beams are then collected into optical fibers routed to transmitters 301 and 302. The separation between maxima is designed to match the separation between modulators and any frequency offset between the two signals can be adjusted by shifting the position of the optical fiber inputs relative to the transceiver optics. The WDM filter response can be approximated by a simple etalon consisting of a dielectric substrate such as glass, coated with partially reflective metal on both sides. The transmission of such an etalon is described in K. D. Moller, Optics, ch. 8 (University Science Books 1988).

Figure 5A:
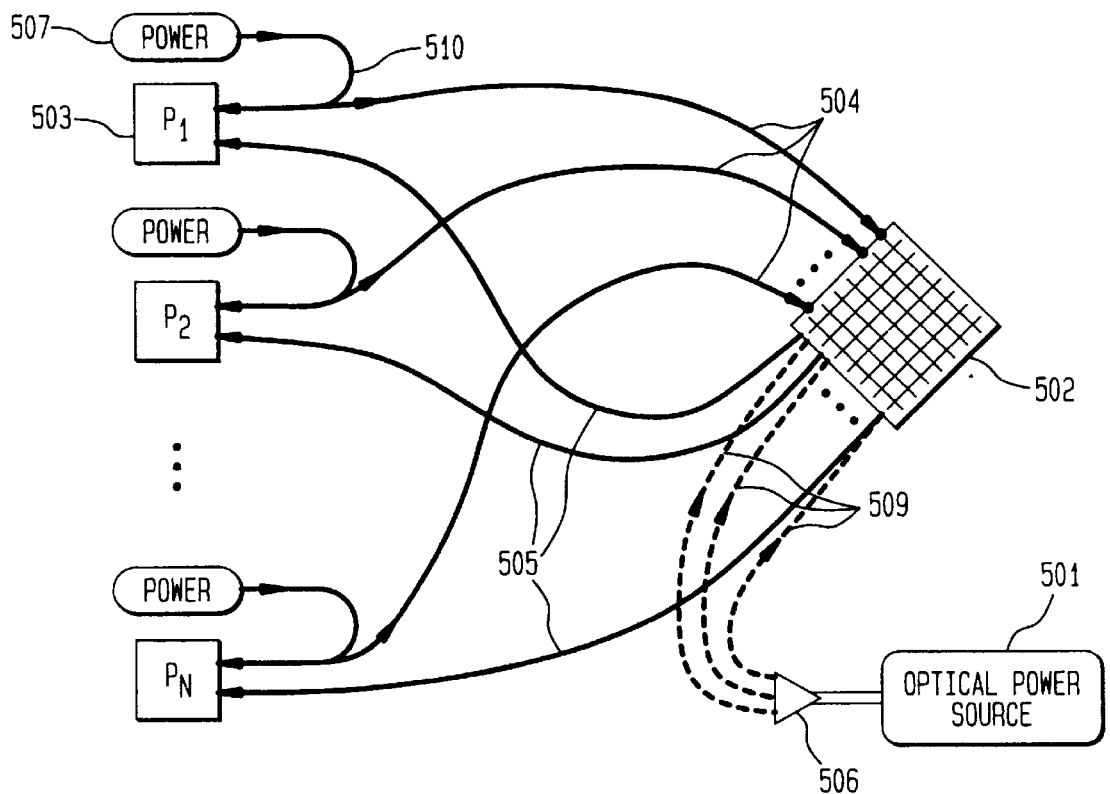
FIG. 5A illustrates a word parallel network where a two dimensional array of optical channels is provided to the interconnection switch and each processor is individually powered by a dedicated laser source.
Figure 5B:
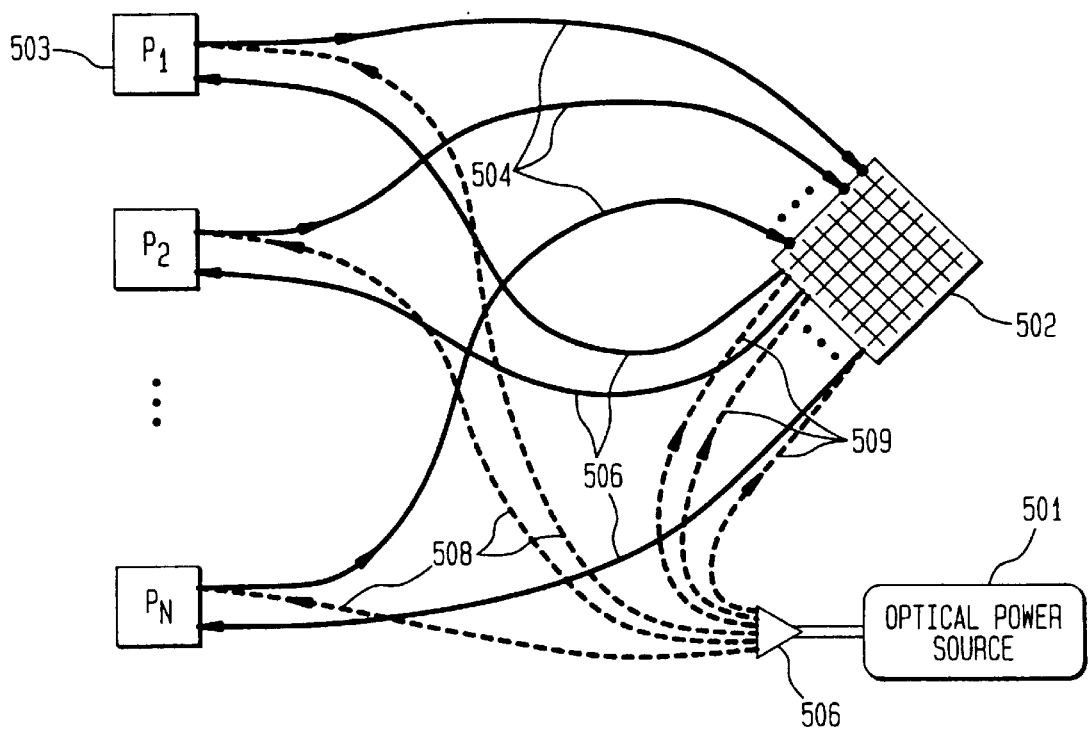
FIG. 5B illustrates a word parallel network where a two dimensional array of optical channels is provided to the interconnection switch and each processor is powered by the same short pulse laser source powering the interconnection switch.

Referring to FIGS. 5A and 5B an application of the present invention is shown where an interconnection switch 502 provides a word parallel network of N optical network interfaces 503 by receiving a two dimensional optical array of inputs and transmitting a two dimensional optical array of outputs. In one embodiment of the present invention the switch 503 is a bit-sliced interconnection switch. An interconnection switch is the subject of a copending and commonly assigned patent application, U.S. patent application Ser. No. 08/691,163, filed on Aug. 14, 1996 entitled "A Bit-Sliced Optoelectronic Interconnection Network," hereby incorporated by reference as if fully set forth herein.

Switch 502 is used to interconnect multiple processors or optical network interfaces 503 in a network at a high rate using a single chip and optoelectronic input and output channels for word parallel networking. A separate interconnection unit, such as a crossbar or multistage interconnection network, is provided for each bit in a word, and each processor is assigned a unique channel with a chip surface port into and out of each interconnection unit. The optical input and output devices are bonded to the face of a single chip using surface nonnal technology, so that the bit channels are distributed over the chip's two-dimensional surface.

Due to the two dimensional array of input and output devices, a two dimensional array of input and output channels is required. The switch's input and output can be serviced by a one dimensional array of optical fibers, where each fiber carries multiple wavelengths. Each optical network interface on the network has a transceiver connected to two fibers, input fiber 505 and output fiber 504, both carrying multiple wavelengths. All of the optical network interfaces in the network can use the same set of distinct wavelengths to transmit and receive each multi-bit words in parallel.

In both FIGS. 5A and 5B switch 502 is powered by power source 501. The power is divided by beamsplitter 506 and guided through power fibers 509. Indeed, FIGS. 5A and 5B are substantially the same except that in 5A each optical network interface has its own broadband light source 507 and power fiber 507, while in 5B beamsplitter 506 is employed so that the same laser source 501 that powers the switch 502 also powers each of the N optical network interfaces 503 through power fibers 508. Referring to FIG. 5B, the optical network interfaces 503 are optically passive, using optical modulators rather than multiple wavelength-stabilized sources. The output of each transmitter is connected to the switch inputs via optical fibers 504, and the switch outputs are connected to each receiver input via optical fibers 505.

Indeed, FIG. 5B illustrates a computer network powered by a single optical source that allows bidirectional communication between multiple optical network interfaces through a central switch. A centralized optical power source for an entire network provides the advantages of global wavelength and clock synchronization. Furthermore, there is a reduced cost in sharing a single high intensity wavelength stable and high power source as compared to providing sources for each optical network interface.

Figure 5C:
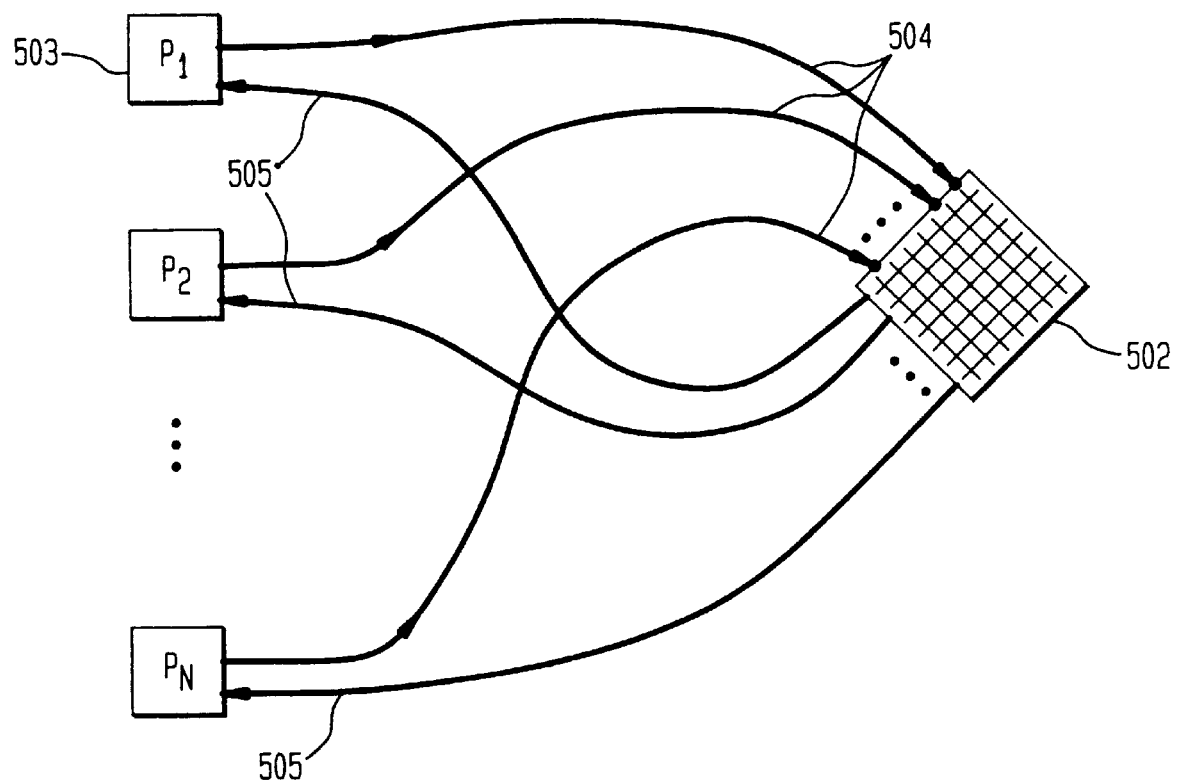
FIG. 5C illustrates a multiprocessor network where transmission by each optical interface is powered with integrated light sources.

As an alternative to an optical power source external to each transceiver and the use of modulators to transmit data on the output channels, each transceiver can comprise light sources integrated on the CMOS substrate, such as VCSELs. FIG. 5C illustrates a multiprocessor network where transmission by each optical interface 503 is powered with integrated light sources, thus eliminating the need for external light sources and modulators.

Figure 6:
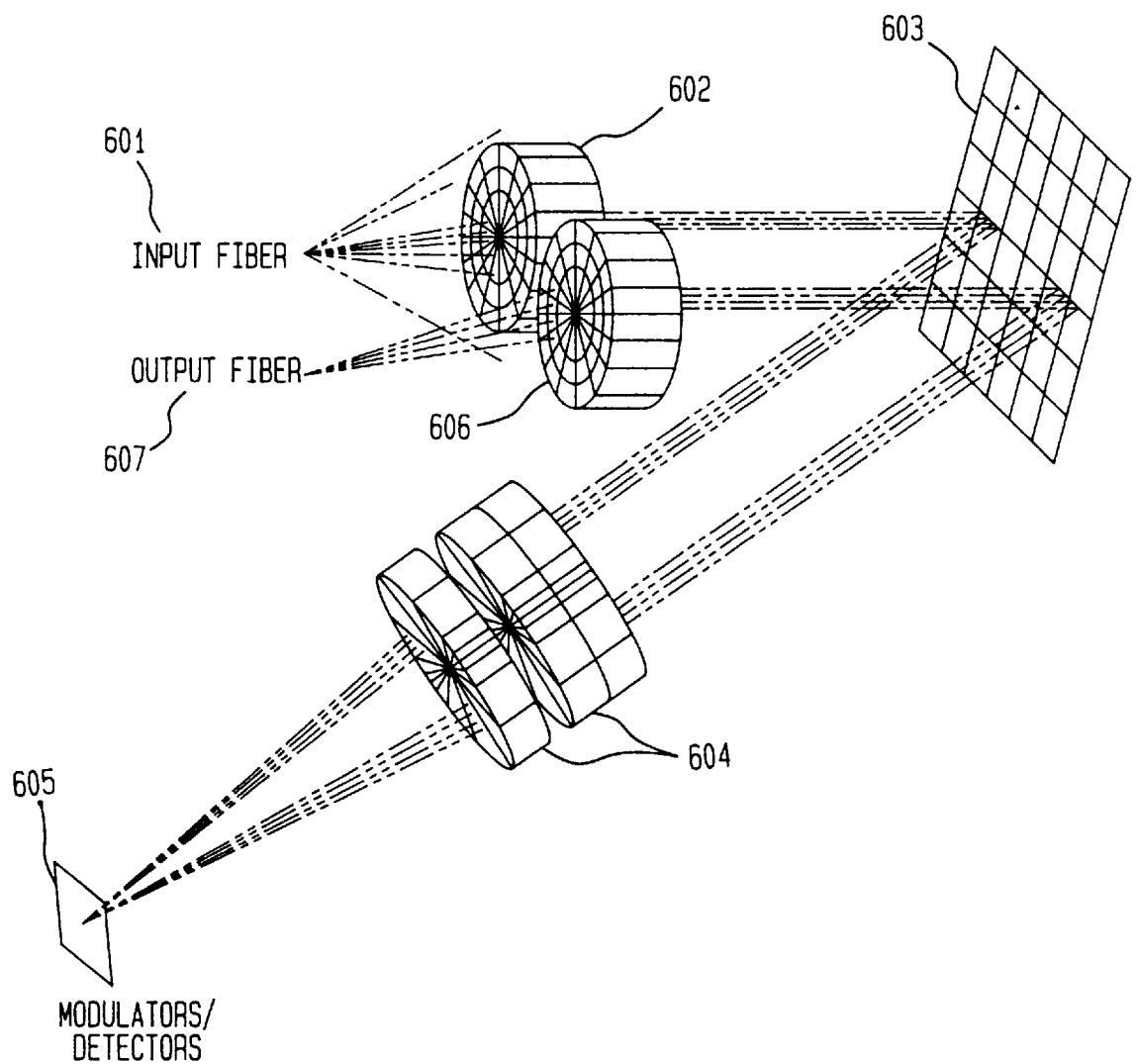
FIG. 6 depicts an off-axis optical system for use in a WDM transceiver where modulators and detectors are arranged on the same surface and outputs are separated from the modulator power fibers.

Referring to FIG. 6, an off-axis optical system for the optical network interface is shown, which uses a technique called pupil division multiplexing, described in F. R. McCormick et al., "Five-Stage Free-Space Optical Switching Network with Field Effect Transistor Self-Electrooptic-Effect-Device Smart Pixel Arrays" Applied Optics vol. 33, No. 8 pp. 1602–18 (1994), hereby incorporated by reference as if fully set forth herein. The optical system can be used in the transceiver of the present invention to distinguish input channels from output channels and facilitate transmission and detection of same. Light from input fiber 601 is collimated by first lens 602 and split by angle into its constituent wavelengths by diffraction grating 603. The back of diffraction grating 603 is blazed so that the diffracted light is directed toward focus lens 604. The separated light is focused by lens 604 onto the device plane where it is detected by an array of optical detectors situated on the surface of device 605. Each wavelength is incident on the device plane a distance from the central wavelength's point of incidence which is approximately proportional to the difference between that wavelength and the central wavelength. The proportionality factor is dependent on the focal length of lens 604 and the pitch of the diffraction grating 603.

Two collimation lenses are used to separate the output light from the input light. The light from input fiber 601, entering lens 604 is laterally shifted from the optical axis of the focus lens 604 so that the light reflected by the modulators on device 605 enters output lens 606 and output fiber 607 rather than lens 602 and input fiber 601.

Figure 7:
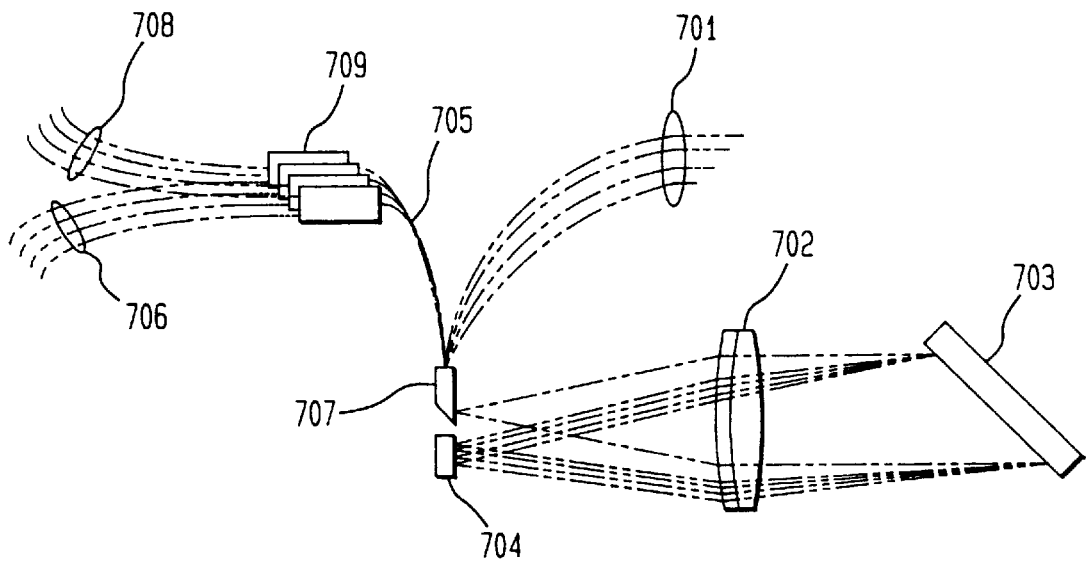
FIG. 7 depicts an on-axis optical system for use in a WDM transceiver or switch where modulators and detectors are arranged on the same surface and signal outputs are carried out on the same fibers used to provide modulator power.

The optical system of FIG. 6 has the disadvantage of using several optical components that must be accurately positioned in three dimensions. As an alternative, a simpler, on-axis configuration, such as that shown in FIG. 7 can be used in a transceiver, as well as the bit-sliced interconnection switch described above. Referring to FIG. 7, a one dimensional array 707 of 2N fibers comprising N input fibers 701 and N power/output fibers 705, are placed in the same plane as the optoelectronic chip 704, using 45° mirrors to deflect light perpendicular to the surface of the chip. Light which is emitted from the fibers is collimated by lens 702 and diffracted by grating 703 in near-Littrow configuration. The diffracted light is focused by a second pass through the same lens 702 onto the optoelectronic chip 704, where each color lands on a different location. While FIG. 7 shows the on axis configuration for a central switch, an on axis optical configuration with only one input fiber and one output fiber could also serve as a transceiver.

If the chip uses CMOS integrated light sources such as VCSELs then each laser is tuned to the appropriate color for its position to align the output to the corresponding output fiber. If the chip holds optical modulators, they must be powered by an external optical source. In this case, the N optical power beams carried on N fibers 708 are sent through N 2×1 fiber optic splitters 709 before entering the fiber array 707. N input fibers 701 can also be held in fiber array 707. The multiple signals carried on multiple wavelengths in each input fiber can be distributed to multiple detectors or the optoelectronic chip 704. The optical power is distributed by wavelength onto the optical modulators. The reflected light is modulated in time so as to carry the desired data signals. This reflected light is then directed by a second pass through the full optical system into the same fibers the optical power came from. The output information is separated from the power fibers at the 2×1 splitters 709, where a fraction of the reflected light is split onto the output fibers 706. Due to the splitters which pass only a fraction of the modulated power to the output fibers 706, the modulator output of this optical system requires more optical power than the output of the off-axis system of FIG. 6.

Figure 8:
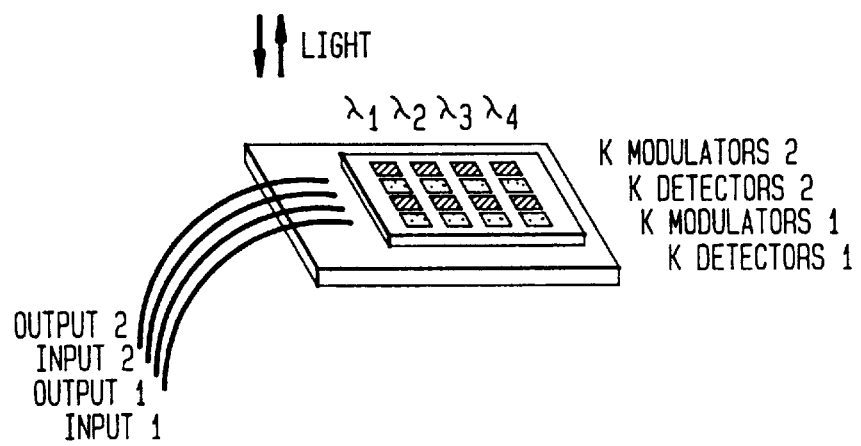
FIG. 8 illustrates an interleaved input/output fiber arrangement for an interconnection switch employing the on-axis optical arrangement of FIG. 6.

Referring to FIG. 8 an integrated package is shown in which the input and output optical fibers at the switch are arranged in a single one dimensional array of length 2N. The inputs and outputs can be placed side by side or interleaved. This arrangement is used together with the on-axis optical system of FIG. 7. The modulator/detector device is mounted on a holder, for example a silicon optical bench substrate, which allows accurate two-dimensional alignment. The fiber array is aligned relative to the device array and bonded. For example, the fibers can be cemented on a silicon optical bench substrate in V-grooves etched on the substrate for that purpose. The fibers are polished with a 45° angle so that the exiting and entering light is at right angles to the fiber axis. If necessary the fiber ends can be coated with a metal or dielectric mirror to increase reflectivity. Alternatively, fiber ends are polished with a 90° angle and a 45° angle reflector can be placed near the fiber face to reflect the light at right angles out of the chip plane.

When used in a transceiver, since there is only a single input fiber and a single output fiber, the optical field is small and the required lenses for this configuration are relatively inexpensive. When using this configuration at the bit-sliced interconnection switch with N input fibers and N output fibers, the optical field is large and it is therefore necessary to use a lens with low field aberrations.

The foregoing merely illustrates the principles of the present invention. Those skilled in the art will be able to devise various modifications, which although not explicitly described or shown herein, embody the principles of the invention and are thus within its spirit and scope.

What is claimed is:

1. A transceiver for multi-bit word parallel communications having one or more input and output optical fibers, where each bit in each multi-bit word is carried on a single distinct wavelength, and said multi-bit word is communicated as wavelength division multiplexed data; comprising:

means for generating a plurality of monochromatic output light beams, each of said monochromatic light beams to optically encode one bit in said multi-bit word;

means for guiding said plurality of monochromatic light beams into one or more of said optical output fibers;

means for receiving one or more of said optical input fibers, each of said optical input fibers carrying wavelength division multiplexed data on a plurality of input light beams;

means for separating said input light beams into distinct monochromatic light beams; and means for detecting said wavelength division multiplexed data carried on said distinct monochromatic light beams.

2. A transceiver according to claim 1 wherein said means for generating a plurality of single wavelength output light beams comprises a plurality of modulators.

3. A transceiver according to claim 2 wherein said modulators are MQW diodes.

4. A transceiver according to claim 2 wherein said modulators are powered by a single broadband light beam and said means for generating further comprises a diffraction grating for separating multiple monochromatic light beams from said broadband light beam, so that each monochromatic light beam is incident on a different one of said modulators.

5. A transceiver according to claim 4 wherein said broadband light beam has a given diameter, said means for generating step further comprises:

means for expanding said diameter of said broadband light beam; and a filter placed at a predetermined angle to said expanded broadband light beam for separating two or more wavelengths with a desired spacing therebetween from said expanded broadband light beam.

6. A transceiver according to claim 5 wherein said filter comprises an etalon having a dielectric substrate with front and back sides, said front and back sides being covered with partially reflective metal or dielectric coating.

7. A transceiver according to claim 2 wherein each of said modulators is powered by a distinct monochromatic light source, and said multiple monochromatic sources are combined into a single optical power fiber using wavelength division multiplexing techniques.

8. A transceiver according to claim 1 wherein said means for generating comprises a plurality of CMOS integrated light sources.

9. A transceiver according to claim 8 wherein said CMOS integrated light sources are VCSELs.

10. A transceiver according to claim 1 further comprising an off-axis optical system for separating said input light beams from said output light beams.

* * * * *